Patented Mar. 25, 1930

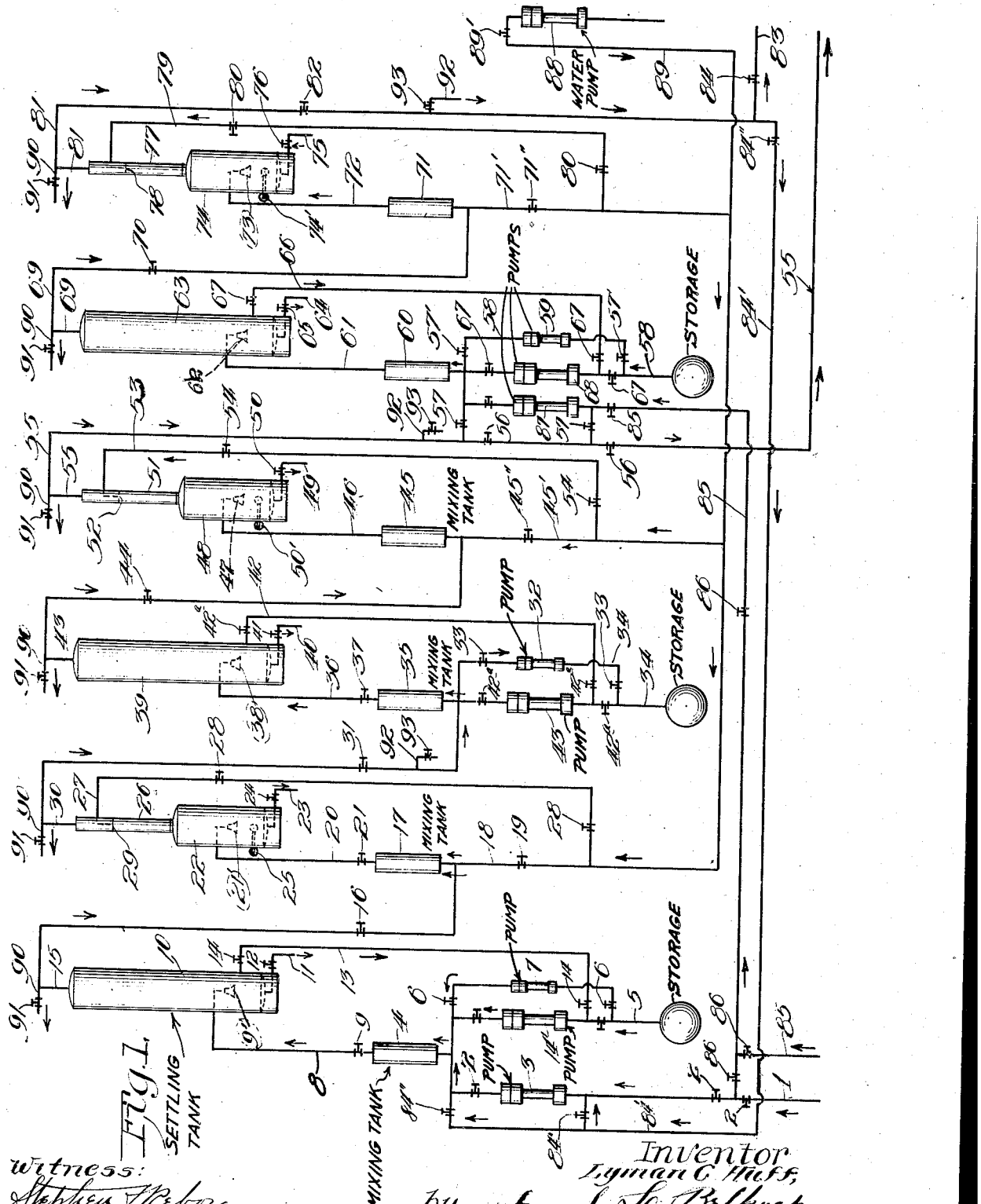

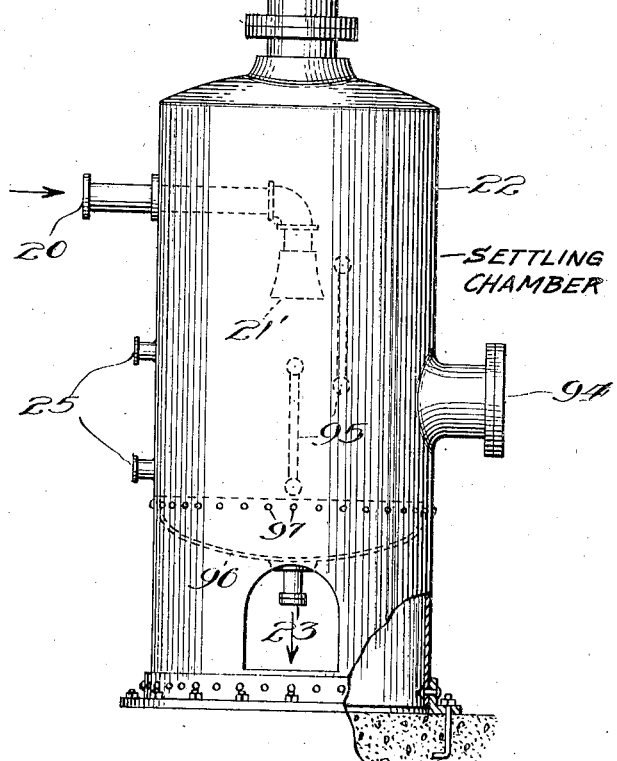

1,751,862

UNITED STATES PATENT OFFICE

LYMAN C. HUFF, OF CHICAGO, ILLINOIS, ASSIGNOR TO UNIVERSAL OIL PRODUCTS COMPANY, OF CHICAGO, ILLINOIS, A CORPORATION OF SOUTH DAKOTA

PROCESS AND APPARATUS FOR TREATING AND PURIFYING HYDROCARBON OILS

Application filed November 15, 1923, Serial No. 674,807. Renewed July 2, 1928.

This invention relates to improvements in process and apparatus for treating and purifying hydrocarbon oils, and refers more particularly to continuously subjecting the products of distillation to the action of certain purifying agents.

The particular embodiment of the invention is directed to a continuous treater, in which the oil may be subjected first to treatment with sulphuric acid being mixed therewith and allowed to settle; then subjected to a double washing treatment, one with pure water, then subjected to a caustic treatment, double washed and drawn off to storage or further subjected to treatment with plumbite and double washed. If it would be desirable to subject the oil to the plumbite treatment (litharge dissolved in caustic soda) first, I have allowed for this in the arrangement of the apparatus. The invention can also be used for simultaneously treating oils of different characters with different purifying agents.

In the drawing:

Fig. 1 is a diagrammatic side elevational view of the continuous treater.

Fig. 2 is a side elevational detail view of one of the water washing and settling tanks, partly in section.

Referring to the drawings, 1 designates the distillate or other oil inlet from any suitable source of supply (not shown), in which is interposed valves 2 and pump 3 leading to the primary mixing tank 4. Sulphuric acid is introduced through the inlet 5 in which are interposed valves 6 and pump 7, to the mixing chamber 4 where the distillate and sulphuric acid are thoroughly mixed. The interior construction of this mixing chamber may be varied, and need not be here described in detail. From the mixing chamber 4, the mixture is forced through the pipe connection 8 controlled by valve 9 to the bell shaped nozzle 9' in the settling tank 10, which in this instance takes the form of a vertical drum about five feet in diameter and about twenty-five feet high.

I preferably use a bell shaped nozzle 9' to gradually reduce the velocity of the liquid and create least possible disturbance of the liquid therein. Also, the nozzle is pointed downwardly to assist the heavier fluids to readily settle out. The nozzle should be located preferably in the center of the tank on a cross section about a third of the distance from the bottom. Separation of the acid and distillate will take place in the settling tank 10, the acid sludge falling to the bottom and drawn off through the acid sludge drawoff 11 controlled by valve 12. A recirculating line 13 controlled by valves 14 and having pump 14' may be connected with the inlet to the primary mixing chamber 4 for returning relatively free acid which has settled out in settling chamber 10 to be reused.

The distillate may be drawn from the upper part of the settling chamber 10 through the drawoff line 15 in which is interposed valve 16 and subjected to a preliminary water wash in the acid washing chamber 17. Water may be introduced into the chamber 17 through the line 18 controlled by valve 19. After the preliminary water wash, the mixture may be drawn off through drawoff line 20 controlled by valve 21 and introduced through spray nozzle 21' to the second settling chamber 22, where a separation occurs, the water and acid falling to the bottom and withdrawn through drawoff 23 controlled by valves 24. A float valve 25 of usual commercial design is provided adjacent the lower portion of the settling tank 22 to control the level of water therein. The upper portion of this tank 22 may be materially reduced in cross sectional area or have positioned thereon a vertical standpipe of smaller diameter as shown at 26, to provide a restricted chamber where the distillate from the chamber 22 is subjected to a secondary wash. Water may be introduced close to its top through the line 27 controlled by valve 28, by means of the circular spray 29, and sprayed downward counter current to the distillate flowing upward, thus insuring a final washing of the distillate with fresh water. By the use of the secondary washer 26, much less water is required for washing, and more impurities removed in the washing.

The distillate may be withdrawn from the chamber 26 through the line 30 in which is interposed the valve 31, and connected to the caustic inlet line 34. Pump 32 and valves 33 are interposed in the inlet line 34. A substantially similar arrangement of apparatus may be used for subjecting the distillate to the caustic wash to fix whatever sulphuric acid is still retained in the distillate, as was used for the sulphuric acid treatment.

The oil and caustic are mixed in the mixing chamber 35, passed through line 36 in which may be interposed valve 37 through the bell shaped nozzle 38 into settling chamber 39. Sludge may be withdrawn through through the drawoff 40 controlled by valve 41. The caustic may be withdrawn through the line 42 controlled by valves 42$^a$ and returned to the inlet line 34 and pump 43 back to the mixing chamber 35. The distillate may be withdrawn from the settling chamber 39 through the line 43 controlled by valve 44 connected to the preliminary water washer 45, which latter is connected by line 46 terminating in the bell shaped nozzle 47, to the settling chamber 48, provided with water and sludge drawoff 49 controlled by valve 50. A float valve 50' is positioned on the lower part of the chamber 48 for automatically regulating the water level therein. Water is introduced into the preliminary washer 45 through the line 45' controlled by valve 45" connected to the source of supply.

The upper portion of settling chamber 48 is restricted as before explained, or provided with the vertical standpipe 51. Water is introduced adjacent the upper portion of pipe 51 through the spray nozzle 52, water line 53, valves 54. The relatively clean distillate may be withdrawn through the line 55, valves 56 and sent to storage or may be subjected to treatment with plumbite to more thoroughly remove all objectionable compounds, by closing valves 56 and opening valves 57 and 57' on the inlet 58 connected to the plumbite storage, pump 59 being interposed therein. Inlet 58 is connected to the plumbite mixing chamber 60, outlet 61, through bell shaped nozzle 62 into settling chamber 63, which latter is provided with plumbite and sludge drawoff 64 controlled by valve 65. Chamber 63 is also provided with drawoff 66 provided with valves 67 for returning the plumbite to the pump 68 to be pumped to the mixing chamber 60 to be reused. Distillate may be withdrawn through the line 69 having valve 70 connected to the preliminary water washer 71 supplied with water through line 71' controlled by valve 71", where the various constituents are thoroughly mixed and agitated and withdrawn through the line 72, and introduced through the bell shaped nozzle 73 located in the settling chamber 74, provided with float valve 74' and with water and sludge drawoff 75 controlled by valve 76 and with the top portion reduced in cross sectional area as explained, or provided with the vertical standpipe 77, where the distillate is subjected to a second water wash introduced through the spray 78 connected to the line 79, provided with valves 80. The cleaned distillate, substantially free of objectionable compounds and treating agents, may be withdrawn through the line 81 controlled by valve 82 and may be sent to storage through line 83 controlled by valve 84.

In case it is desirable to treat the distillate with plumbite first and then subject it to the sulphuric acid and caustic treatment, the distillate is drawn from storage through the line 85, valves 86, pump 87 connected to the mixing chamber 60, valves 57 being closed. In this event, the distillate from the chamber 77 may be returned to the mixing chamber 4 connected to the pump 3 through lines 84' and valves 84", valve 84 being closed, and valves 57' being open. Water pump 88 is connected to water charging line 89 controlled by valves 89', the line 89 being connected to the various water washing chambers as explained. Vents 90 controlled by valves 91 may be tapped into the drawoff lines 15, 30, 43, 55, 69 and 81 for releasing the air when starting the system.

The system explained is adapted to operate under say one hundred pounds working pressure. It will be seen that the positioning of the water spray in the standpipe or restricted areas 26, 51 and 77, spraying downward counter current to the distillate rising upward, will insure a final washing of the distillate with fresh water.

By the use of this secondary washer, less water is required for washing and more impurities are removed in the washing. The use of the above described apparatus effects better washing and settling of the distillate and reduces to a minimum the amount of acid, caustic and water required for treating distillate.

I may provide sample drawoff lines 92 controlled by valves 93 in the lines 30, 55 and 81 for drawing off samples of the treated oil from time to time for analysis.

I have described a continuous treater for purifying one grade or character of distillate. The invention herein described, is adapted to simultaneously treat two oils of different grades, gravities or characteristics. For example, I may introduce through the line 85 and pump 87 a cracked distillate resembling gasoline and subject it only to the plumbite treatment and withdraw to storage through the line 83, while simultaneously introducing a heavier gravity distillate resembling kerosene through the line 1, subjecting the latter to the sulphuric and caustic treatment and withdrawing to storage through the line 55, valves 56 being open and valves 57 being closed. In other words, where oils of different characteristics require different treatments, I may treat them simultaneously in the above described apparatus.

In Fig. 2, I have shown, on an enlarged scale, the first combined settling and restricted mixing chamber. It will be understood that the others in the system are substantially similar. The settling chamber 22 may have the manhole 94 sight gauge glasses 95, rounded bottom portion 96 riveted or otherwise secured as shown at 97, which pan has sludge drawoff 23 as explained.

I claim as my invention:

1. A process for purifying liquid distillate obtained from the pressure distillation of hydrocarbon oils, consisting in initially introducing a quantity of the distillate and a quantity of plumbite to a mixing chamber, in thence passing the mixed plumbite and distillate to a settling chamber, in then subjecting the distillate successively to a treatment with sulphuric acid and caustic soda and subjecting the distillate to successive water washing treatments following each of said treatments, and in maintaining a superatmospheric pressure on the distillate undergoing treatment.

2. A continuous process for purifying hydrocarbon distillate obtained from the pressure distillation of hydrocarbon oils, consisting in initially treating the distillate with plumbite, in thereafter treating the distillate successively with sulphuric acid and caustic soda and in subjecting the distillate, intermediate each treatment, to water washing, by causing the same to flow through a confined zone countercurrent to a spray of water, and in maintaining a superatmospheric pressure on the distillate undergoing treatment.

3. An apparatus for purifying hydrocarbon distillate, comprising means for initially subjecting the distillate to treatment with plumbite, means for thereafter successively subjecting the distillate to sulphuric acid and caustic soda treatments, means for water washing the distillate, intermediate each of said treatments, said last mentioned means comprising a settling chamber having a lower section of enlarged cross-sectional area and an upper section of relatively small cross-sectional area and a water spray disposed near the top of said upper section, whereby the distillate is caused to flow countercurrent to the spray of water.

4. A process for purifying liquid distillate obtained from the pressure distillation of hydrocarbon oils comprising initially introducing a quantity of the distillate and a quantity of plumbite to a mixing chamber, thereafter subjecting the distillate successively to a treatment with sulphuric and caustic soda and subjecting the distillate to successive water washings following each of said treatments, and maintaining a superatmospheric pressure on the distillate undergoing treatment in the process.

5. An apparatus for purifying hydrocarbon distillate, comprising means for initially subjecting the distillate to treatment with plumbite, means for thereafter successively subjecting the distillate to sulphuric acid and caustic soda treatments, means for water washing the distillate, said last mentioned means comprising a settling chamber having a lower section of enlarged cross-sectional area, a restricted upper section and a water spray disposed near the top of said upper section, whereby the distillate is caused to flow countercurrent to the spray of water.

LYMAN C. HUFF.